United States Patent [19]

Weiser et al.

[11] Patent Number: 4,860,329
[45] Date of Patent: Aug. 22, 1989

[54] X-RAY FLUORESCENCE THICKNESS MEASURING DEVICE

[75] Inventors: Murray Weiser, Syosset; William Silverman, Melville; Zvi Landau, New-Gardens; Paul Finer, Roslyn Heights; Cary I. Pincus, Wantagh, all of N.Y.

[73] Assignee: UPA Technology, Inc., Syosset, N.Y.

[21] Appl. No.: 832,479

[22] Filed: Feb. 24, 1986

[51] Int. Cl.[4] .............................................. G01B 15/02
[52] U.S. Cl. ...................................... 378/50; 378/148; 378/160
[58] Field of Search ................... 378/44, 50, 147, 148, 378/157, 49, 53, 54, 160, 156; 350/272

[56] References Cited

U.S. PATENT DOCUMENTS

| 2,642,537 | 0/1953 | Carroll. | |
|---|---|---|---|
| 2,711,480 | 0/1953 | Friedman. | |
| 3,275,831 | 9/1966 | Martin | 378/160 |
| 3,402,292 | 9/1968 | Baecklund | 378/157 |
| 3,684,887 | 8/1972 | Hugonin | 378/160 |
| 4,162,528 | 0/1979 | Maldonado. | |
| 4,172,223 | 0/1979 | Ishijima. | |
| 4,331,866 | 5/1982 | Batzdorff | 250/231 SE |
| 4,406,015 | 0/1983 | Koga. | |
| 4,559,448 | 12/1985 | Rozsa | 250/231 SE |
| 4,597,093 | 6/1986 | Fischer | 378/50 |
| 4,648,107 | 3/1987 | Latter | 378/50 |

FOREIGN PATENT DOCUMENTS

| 3239379 | 4/1984 | Fed. Rep. of Germany | 378/50 |
|---|---|---|---|
| 60-253956 | 12/1985 | Japan | 378/44 |
| 60-256036 | 12/1985 | Japan | 378/50 |

OTHER PUBLICATIONS

Zimmerman, "X-Ray Measurement of Plating Thickness", 3/61, p. 10 of American Jewelry Manufacturer.
Zimmerman, "Industrial Applications of X-Ray Methods for Measuring Plating Thickness", 3/61, p. 27 of Quality Assurance.

Primary Examiner—Craig E. Church
Attorney, Agent, or Firm—Lilling & Greenspan

[57] ABSTRACT

An X-ray fluorescence thickness measuring devise includes a primary X-ray beam collimation and workpiece positioning system that markedly increases the detectable fluorescent X-radiation from diverse specimen calibration standards and workpieces subjected to measurement. The positioning system includes an optical viewing system that provides a video signal image of the specimen surface prior to and during specimen radiation without hazard to the unit operator and independent of the collimator bore selected. A further feature of the measuring device is that it includes a system which assures repetitive and accurate positioning of a selected collimator relative to the axis of the X-ray beam to obtain maximum beam transmission therethrough.

16 Claims, 10 Drawing Sheets

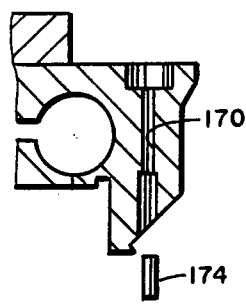
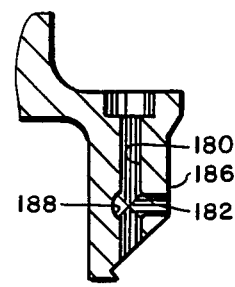
FIG.11　　　　　　　FIG.12
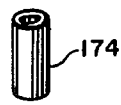
FIG.13
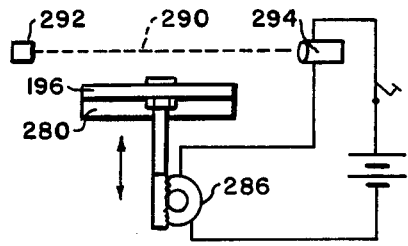
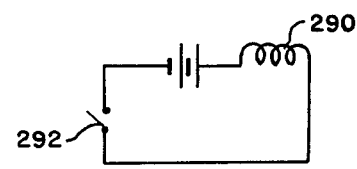
FIG.14　　　　　　　FIG.15

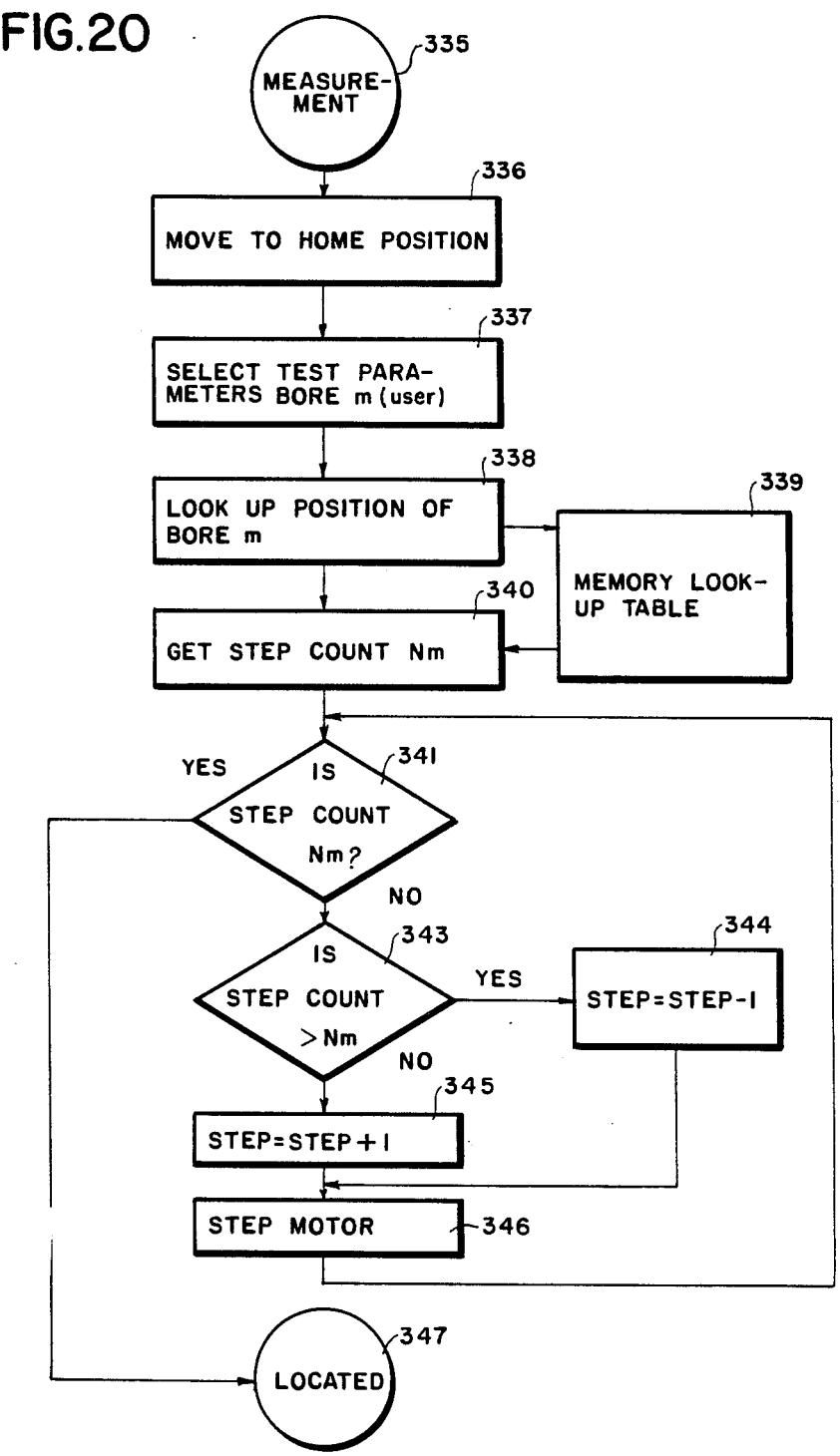

X-RAY FLUORESCENCE THICKNESS MEASURING DEVICE

BACKGROUND OF THE INVENTION

1. Field of the Invention

This invention relates to an improved construction for X-ray fluorescence thickness measuring apparatus.

2. Description of the Prior Art

The utilization of X-ray fluorescence phenomena as a vehicle for the nondestructive measurement of the thickness of thin films on basal substrates of differing elemental composition has long been recognized, as exemplarly evidenced by U.S. Pat. Nos. 2,642,537 and 2,711,480. Articles by Zimmerman, "X-Ray Measurement of Plating Thickness" in American Jewelry Manufacturer, March 1961, p. 10 and "Industrial Applications of X-Ray Methods for Measuring Plating Thickness" in Quality Assurance, March 1963, p. 27 also evidence early commercial usage of such X-ray fluorescence phenomena in the measurement of plating thicknesses.

Fundamental to thickness measurement techniques employing X-ray fluorescence phenomena is the measurement of a quantum of fluorescent X-radiation generated by exposure of a calibration standard of known composition and film thickness to an incident X-ray beam and the comparison thereof with a similarly measured quantum of fluorescent X-radiation generated by exposure of a workpiece of like compositional character and unknown film thickness to an incident X-ray beam of like character. In general, the greater the quantum of detected fluorescent X-radiation, which a function of both intensity of the fluorescent X-radiation and the time permitted for detection thereof, the greater is the accuracy of measurement. As a practical matter, accuracy of measurement, because of essential statistical approach in detection and the desire to keep the time required for measurements to a minimum, is thus largely dependent upon the amount of detectable fluorescent X-radiation that is generated per unit of time. Such accuracy of measurement and the correlative reproducibility of the results obtained are, in turn, largely dependent upon the maintenance of a constancy of a number of interrelated operating parameters including the intensity of the primary X-ray beam, the diameter of incident primary X-ray beam relative to the area available for exposure, the positioning of the workpiece relative to the axis of the primary X-ray beam, the character and quality of the detector system and, as noted above, the time allotted for workpiece exposure.

The competitive pressures of recent years, coupled with increasingly restrictive product specifications and increases in the cost of commonly plated metals, e.g. gold, have contributed to a renewed focus on the utilization of X-ray fluorescence phenomena for thin film thickness measurement. Such renewed focus has in turn led to a need for higher degrees of measurement accuracy and reliability consistant with operational safety, increased measurement capacities, increased conveniences in usage and the minimization of operator participation in and control of the measurement process and the determination of the results thereof. Among some of the more recent patents that generally reflect such renewed focus are U.S. Pat. Nos. 4,162,528, 4,406,015, 4,534,049 and 4,172,223.

SUMMARY OF THE INVENTION

This invention may be briefly described as an improved construction for X-ray fluorescence thickness measurement apparatus that includes, in its broader aspects, an improved primary X-ray beam collimation and workpiece positioning system that functions to markedly increase the quanta of detectable fluorescent X-radiation obtainable per unit of time from increased numbers of diverse specimen calibration standards and workpieces being subjected to measurement. The subject invention further includes, in its narrower aspects, an improved optical viewing system that continuously provides a video visual image of the specimen surface relative to the axis of the incident X-ray beam prior to and during specimen radiation without hazard to the unit operator in association with an improved workpiece positioning system and a selectively displaceable multi-bore collimator assembly having a mirror integral with the undersurface thereof so as to automatically coalign the optical viewing axis and the longitudinal axis of a selected dimension collimator bore with the axis of the incident X-ray beam, independent of the particular collimator bore selected. Still another aspect of the invention of an improved system for repetitive positioning of a selected collimator relative to the axis of the incident X-ray beam to obtain maximum beam transmission therethrough.

Among the advantages of the subject invention is the provision of an improved X-ray fluorescence thickness measurement device that provides both increased measurement capacity and accuracy of measurement, reduced operator participation in the measurement process and in the result determination and a markedly increased automation of performance through permitted application of digital data processing techniques thereto. Still other advantages include the provision of an improved multi-bore collimator assembly having an optical viewing mirror integral with the undersurface thereof for X-ray fluorescence thickness measuring instruments. Still other advantages are the provision of a multi-bore collimator-mirror element and positioning system therefore that automatically provides accurate repetitive coaxial alignment of the longitudinal axis of the primary X-ray beam with a selected collimating bore and with the optical axis of a viewing system. A still further advantage is a permitted expansion of both measurement capacity and convenience of use for X-ray fluorescence thickness measuring instruments. Still another advantage of the invention is the permitted separation of the shutter and filter elements from the collimator-mirror assembly with an attendant further simplification of construction and improvement in operation in such X-ray fluorescence type measuring instruments.

The primary object of this invention is the provision of a improved X-ray fluorescence apparatus for the nondestructive thickness measurement of thin films and the like.

Another object of this invention is the provision of an improved construction for a nondestructive thickness measuring apparatus employing X-ray fluorescence phenomena that provides increased measurement accuracy and reliability, reduced operator participation, significantly improved convenience of usage and expanded measurement capacity.

Other objects and advantages of the subject invention will become apparent from the following portions of this specification and from the appended drawings which illustrate, in accord with the mandate of the patent statute, a presently preferred embodiment of an X-ray fluorescence thickness measuring device incorporating the principles of this invention.

BRIEF DESCRIPTION OF THE DRAWINGS

Referring to the drawings:

FIG. 5 is a side sectional view, in essentially schematic format, showing the positioning of the primary X-radiation generating and transmitting components and fluorescent X-radiation detecting components and the operational interrelationships there between;

FIG. 11 is an enlarged vertical section through a collimator receiving bore in the collimator carriage element of FIG. 8;

FIG. 12 is an enlarged vertical section through a second form of bore in collimator carriage element for accommodation of automatic adjustment of certain operating parameters;

FIG. 13 is an oblique view of an insertable collimating sleeve;

FIG. 14 is a schematic depiction of a vertical displacement control for the specimen stage;

FIG. 15 is a simplified schematic control circuit for horizontally displacing the specimen stage to render the same accessable for workpiece positioning thereon;

FIG. 20 is a flow chart of the procedure to accurately align the collimator sleeves to their optimum positions during the measurement mode of operation.

DESCRIPTION OF THE PREFERRED EMBODIMENTS

Figure 1:
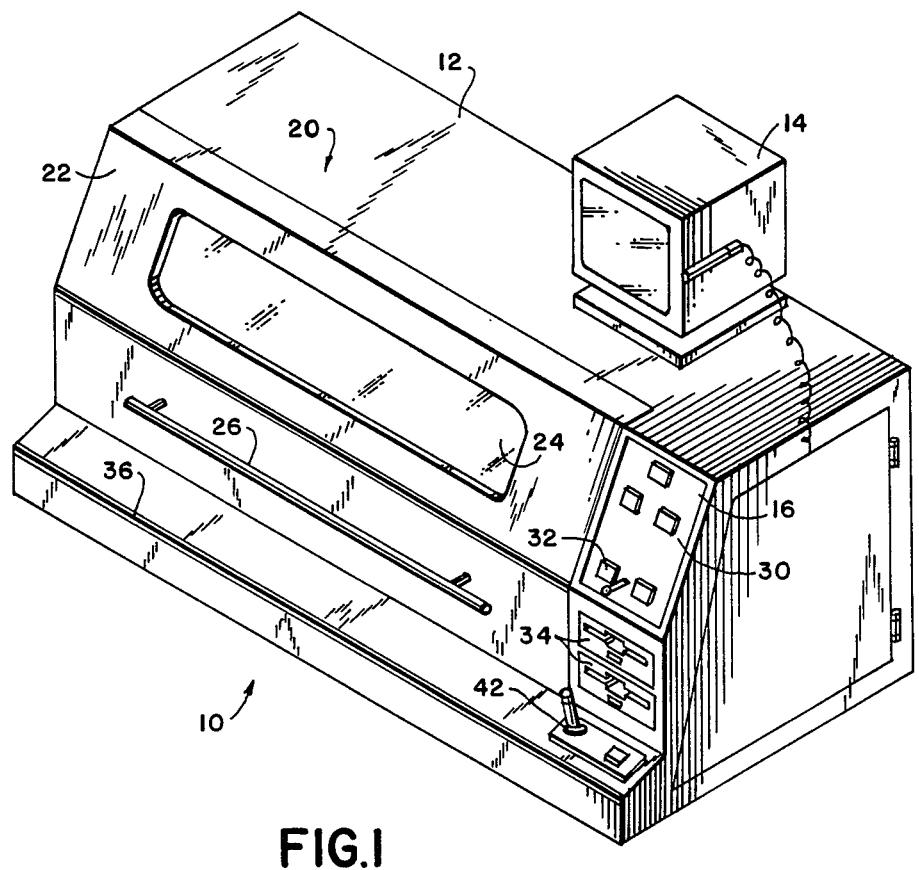
FIG. 1 is a front elevation of a presently preferred embodiment of an X-ray fluorescence thickness measurement apparatus incorporating the principles of this invention.
Figure 2:
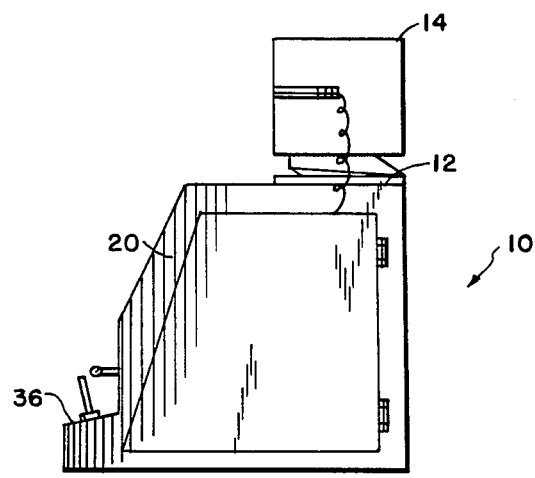
FIG. 2 is a side elevation of the apparatus shown in FIG. 1.

Referring initially to FIGS. 1–4 there is provided a generally box-like housing 10 whose upper surface 12 provides a convenient support for a video display unit 14. The right hand portion 16 of the housing 10, as viewed in FIG. 1, is adapted to contain substantially all of the electronic and data processing components of the control and measurement system on suitable panels, printed circuit boards and the like. Access thereto may be conveniently obtained through a hinged panel 18 forming a part of the side wall 20. The front portion of the housing 10 comprises an elevatable door panel 22 having a leaded glass observation window 24 therein and a handle member 26 adjacent the lower marginal edge thereof. Disposed adjacent to the door panel 22 is a chamber control panel 30 having various operating signals, warning lights and power control devices, generally designated 32, thereon. Disposed there beneath are a pair of disc drive housing assemblies 34 for conventional memory disc insertion therein. Positioned below the disc drive housing assemblies 34 and on an inclined panel portion 36 at the base of the control panel portion 30 is a joystick type control element 40 for providing three dimensional manual control of the positioning of a specimen and workpiece supporting stage 42, as will be hereinafter described in greater detail.

Figure 3:
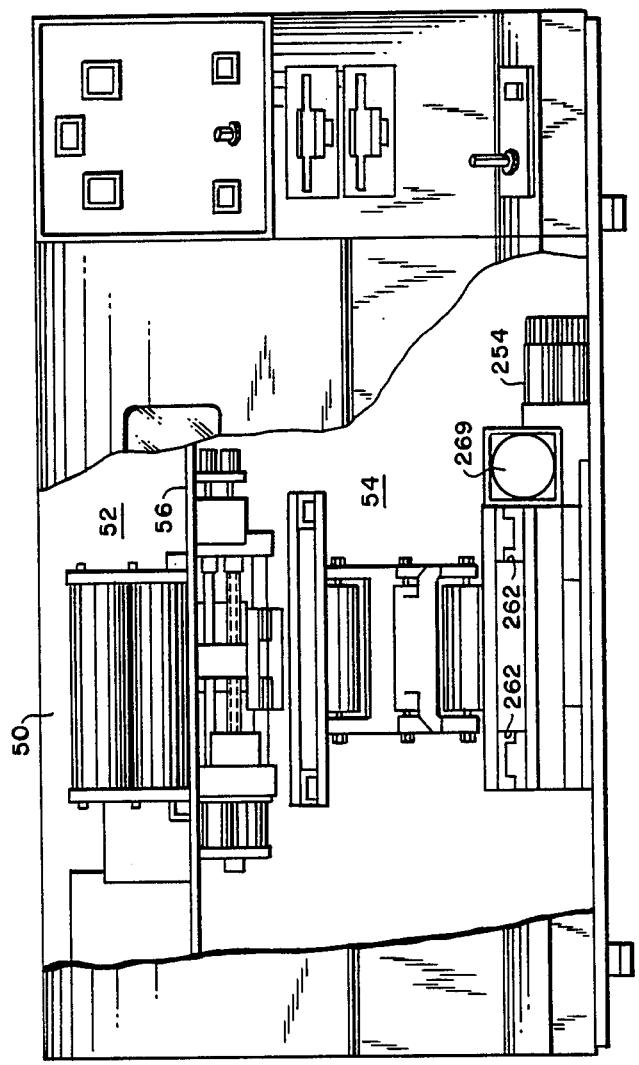
FIG. 3 is a front elevation, partially cut away, showing the positioning of the major internal components thereof.
Figure 4:
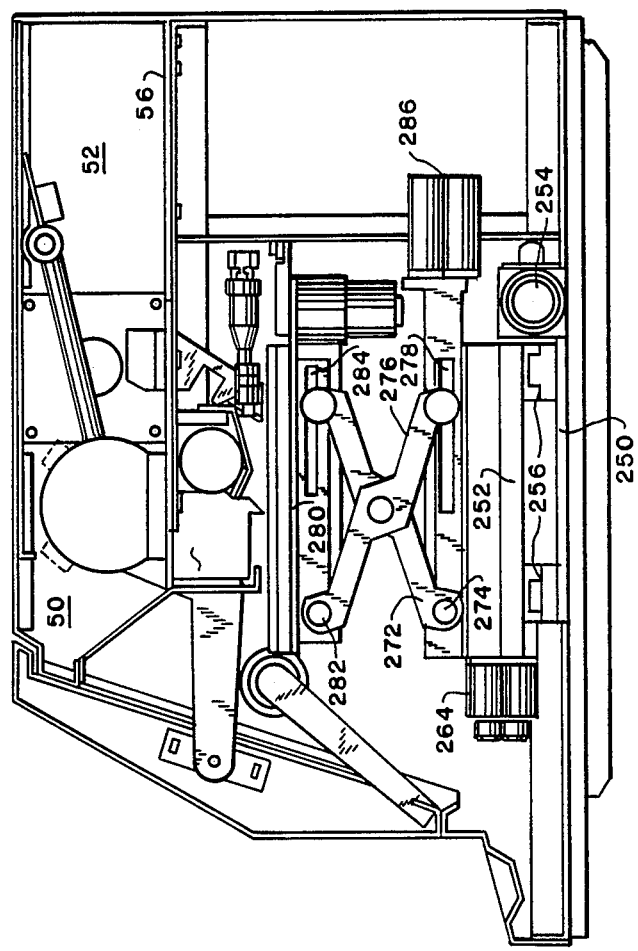
FIG. 4 is a side elevation, as generally viewed on the line 4—4 of FIG. 1, showing the positioning of the major internal components thereof.
Figure 5:
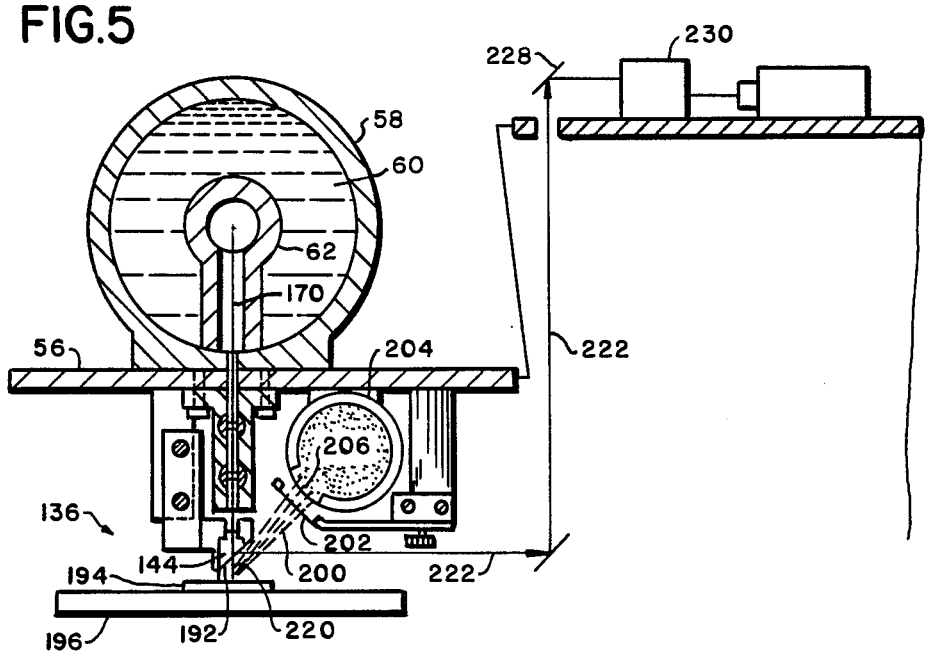
Figure 6:
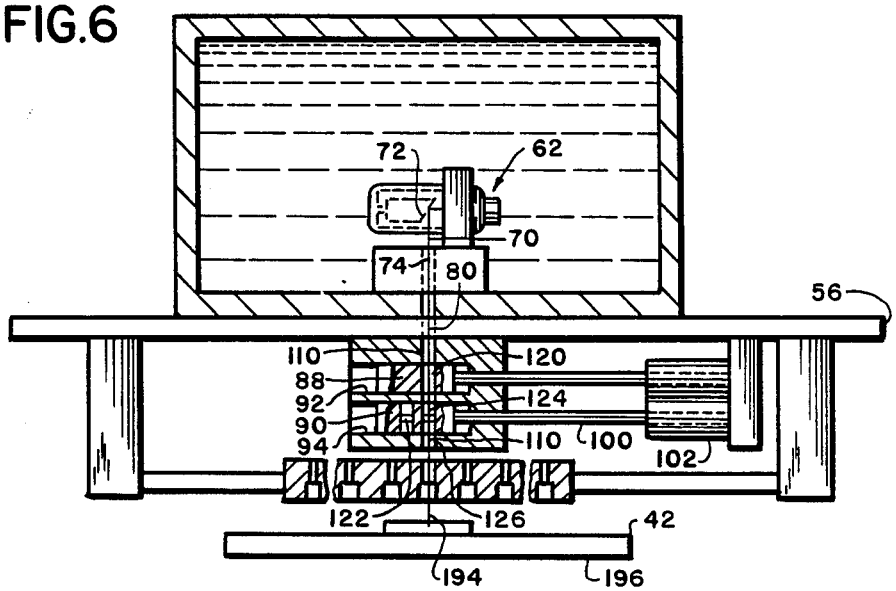
FIG. 6 is a front sectional view, in essentially schematic format, of the components depicted in FIG. 5.

Referring now more particularly to FIGS. 3 through 7, the interior of the main portion 50 of the housing 10 is divided into an upper portion 52 and a lower portion 54 by a transverse plate 56. Disposed within the upper portion 52 and mounted on the plate 56 is an X-ray tube enclosure 58, conventionally field with oil 60 and having a high intensity X-ray tube 62, preferably with a beryllium window and a small focal spot, disposed therewithin. As best shown in FIGS. 5 and 6, the primary X-ray beam 70 emanating from the target 72 in the tube 62 is directed downwardly through a bore 74 in the X-ray tube mounting block 76, a coaligned bore 78 in the X-ray tube enclosure 58 and is introduced onto the lower chamber portion 54 through a third coaligned bore 80 in the mounting plate 56. As will be apparent, the coaligned bores 74, 78 and 80 are all desirably of the same nominal diameter and in addition to providing a channel for transmission of the primary X-ray beam 70 from upper to the lower portion of the housing also perform a first collimating function in limiting the normal conical spread of the X-ray beam 70.

Mounted on the underside of the transverse plate 56 and disposed generally beneath the X-ray tube 62 is a housing block 86 for a shutter assembly and a primary filter assembly. The housing block 86 includes an upper transverse bore 92 sized to slidably contain a cylindrical shutter plug element 88 and a lower transverse bore 94 adapted to slidably contain a cylindrical primary filter element 90. The shutter plug element 88 is connected to an armature rod 96 of a shutter solenoid 98 and is thus adapted to be slidably displaced within the bore 92 in response to solenoid actuation. In a similar manner, the primary filter element 90 is connected to an armature rod 100 of a separate filter solenoid 102 and is thus adapted to be slidably displaced within the bore 94 in response to solenoid actuation.

The housing block 86 includes a fourth coaligned bore 110 that diametrically traverses the transverse bores 92 and 94. Such fourth bore 110 is coaligned with and is desirably of the same diameter as that of bores 74, 78 and 80 and essentially functions as a continuation thereof with a further enhancement of the collimating function. The shutter, plus element 88 includes a diametric bore 120 displaceable into and out of coaligned relation with the fourth coaligned bore 110 in the housing block in response to the state of energization of the solenoid 98. The diametric bore 120 is desirably of the same nominal diameter as that of the bore 110. The shutter plug element 88 is normally biased in such manner as to position the shutter element bore 120 out of coaligned relation with the bore 110 and thus serve to normally close the transmission conduit for the primary X-ray beam 70. When so biased, energization of the shutter solenoid 98 will effect controlled shutter plug element 88 displacement in such manner as to position bore 120 in coalignment with the bore 110 and thus permit passage of the primary X-ray beam 70 therethrough.

In a generally similar manner the primary filter element 90 includes a plurality of diametric bores, such as the bores 122 and 124, each of which are selectively positionable in coaligned relation with the transverse bore 110 in the block 86 in accord with a state of energization of the solenoid 102. Disposed within at least one of the diametric bores such as the bore 122, is a filter element 126 so constituted as to minimize the transmission of unwanted X-radiation wavelengths for certain measurement applications.

As will now be apparent, the above described construction provides for an elongate transmission channel for the primary X-ray beam 70 through the coaligned bores 74, 78, 80, 110, 120 and 124, each of which is of the same nominal diameter. Such channel may be readily sealed off by positioning the bore 120 in the shutter plug element 88 out of coaligned relation with the bore 110 in the block 86 and the normal biasing of such shutter plug to effect such noncoaligned relation facilitates, through simple interlock devices, the automatic closure of the primary X-ray beam channel for safety purposes, as for example, when the front panel 22 is opened or the like.

Disposed beneath the stationary housing block 86 for the above described shutter plug assembly and primary filter assembly is a transversely displaceable collimator carriage assembly, generally designated 136. The collimator carriage assembly 136 includes a backing or mounting element 138 adapted to be slidably supported on a pair of rails 140, 142 and an elongate base element 144 disposed beneath the above described transmission channel for the primary X-ray beam 70. Transverse displacement of collimator carriage assembly 136 along the rails 140, 142 so as to permit selective positioning of particular portions of the base element 144 thereof in precise coalignment with the coaligned bores 74, 78, 80, 110, 120 and 124 is obtained through an independent drive system, suitably a rack and pinion drive 150 driven by an independent stepper motor 152.

As best shown in FIGS. 8 through 11 a presently preferred construction for a collimator assembly 136 includes an elongate recess 160 on the upper surface 162 of the base element 144 that is adapted to receive and contain a dependent nipple-like extension 164 dependent from the housing block 86 and serving as an extension of the bore 110 that defines the transmission channel for the primary X-ray beam 70. The disposition of such nipple-like extension 164 within the recess 160 serves to minimize escape of primary beam X-radiation as it passes from the housing block 86 to the collimator carriage assembly 136.

Disposed in longitudinal alignment within the recess 160 are the upper ends of a plurality of discrete vertical measurement bores 170, suitably 8 to 11 or more, that extend vertically through the elongate base element portion 144 of the collimator carriage assembly 136 and serve, when individually positioned in longitudinal coalignment with the aforesaid bores 74, 78, 80, 110, 120 and 124, as extensions of the transmission channel for the primary X-ray beam. Each of the bores 170 dependently terminate in an enlarged diameter collimator sleeve receiving bore 172. Each collimator sleeve receiving bore 172 is designed to receive and contain a cylindrical collimating sleeve 174 (see FIG. 13) of standard or common external diameter and having a longitudinal bore of predetermined internal diameter 176 which is preselectable in accord with the maximum area of desired exposure to primary X-ray beam incidence on a given workpiece.

Also included in the collimator carriage assembly base element portion 144 are a plurality of automatic adjustment bores 180, as generally depicted in FIG. 12. These bores 180 are of larger internal diameter than those of the measurement bores 170 and extend vertically through the full height of the base element portion 144. Each of the bores 180, however, are intersected by a horizontal bore 182 disposed at right angles thereto and which terminates in an aperture 184 on the rearwardly facing surface 186 of the base element 144. As will later be described, a standard sample element 188 of predetermined character is disposed at the point of bore intersection to permit fluorescent X-radiation generated by exposure thereof to the primary X-ray beam to pass to a detector through the horizontal bore 182 for automatic detection, correction and accommodation of possible drift in the output of the X-ray tube 62 and possible change of detector characteristics.

The bottom portion of the base element 144 of the collimator carriage assembly 136 is bevelled to provide a rearwardly facing flat surface 190 disposed at 45° to the vertical axis of the bores 170 and 180. Mounted on such bevelled surface 190 is a thin planar mirror element 192 that extends over the full width of the base element 144.

Figure 7:
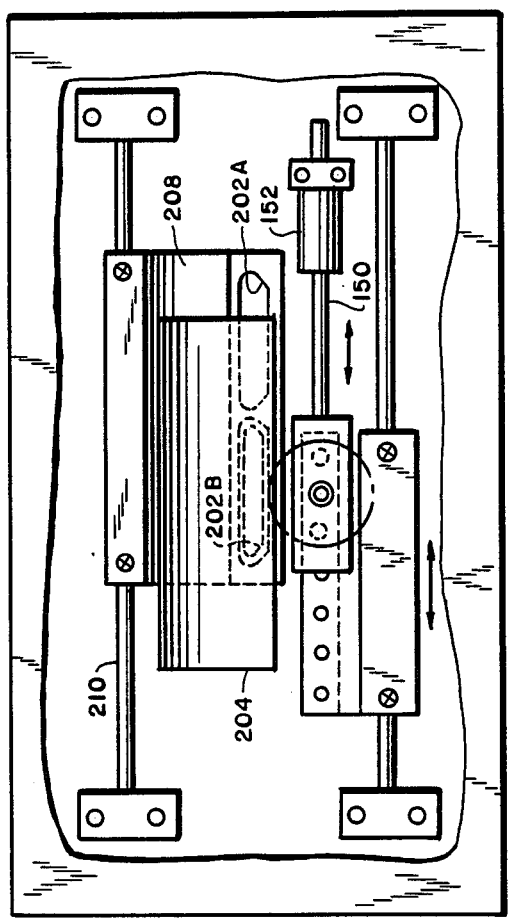
FIG. 7 is a top view, in essentially schematic format, of the components depicted in FIGS. 5 and 6.
Figure 8:
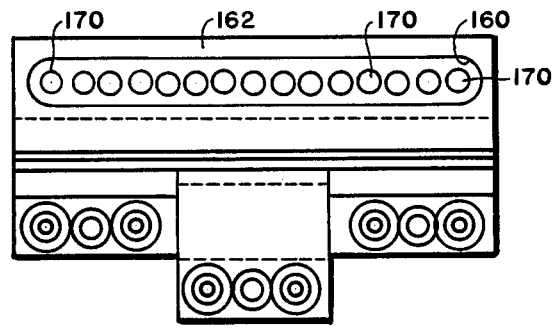
FIG. 8 is a plan view of a preferred construction for a collimator carriage assembly.
Figure 9:
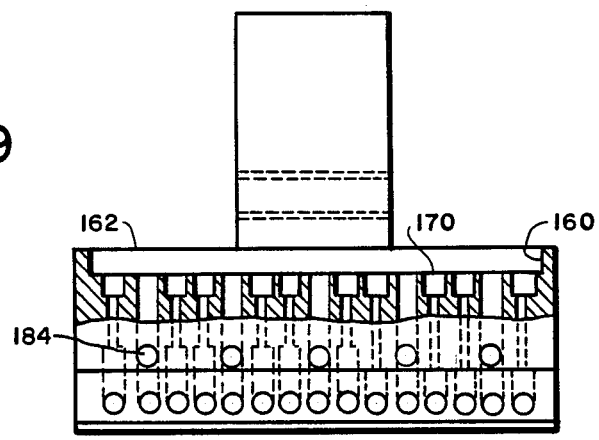
FIG. 9 is a front elevation, partially in section, of the collimator carriage assembly shown in FIG. 8.
Figure 10:
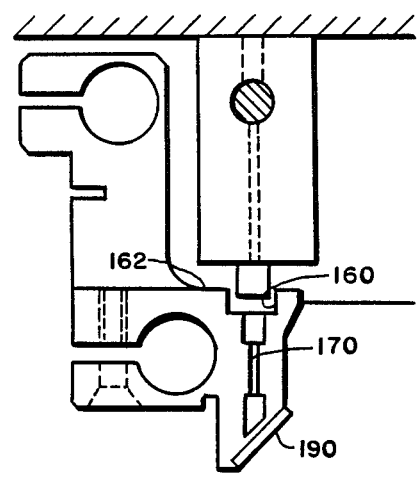
FIG. 10 is a vertical section on the line 10—10 on FIG. 8.

Returning now to FIGS. 5 to 7, it is now apparent that the collimator carriage assembly 136 may be selectively positioned to locate a particular longitudinal bore 170 having a selectively sized collimating sleeve insert 174 therein in coaligned relation with the primary X-ray beam transmission channel as defined by the above described bores 74, 78, 80, 110, 120 and 124 so as to permit such primary X-ray beam to pass through such sleeve 174 and impinge upon a sample or specimen 194 mounted on a stage plate 196 disposed therebeneath. Such primary X-ray beam impingement, as best shown in FIG. 5, results in the generation of fluorescent X-radiation 200, a portion of which passes through a filter 202 and enters a detector 204 through a window 206 therein. Desirably, and as shown in FIG. 7, a pair of filters 202A and 202B are provided, mounted in a frame 208 that is slidably displaceable along a rail 210 to accommodate varying types of filters as may be required.

As best shown in FIG. 5, the inclined mirror 192 mounted on the bottom portion of the base element 144 of the collimator carriage assembly 136 forms a part of an optical system that provides not only for proper and accurate workpiece positioning with respect to the point of incidence of the primary X-ray beam thereon but also provides for continuous operator viewing of the workpiece prior to and during the measurement cycle. To the above ends the mirror 192 functions to coalign the optical axis of the viewing system with the axis of the primary X-ray beam 170 in the space between the workpiece surface and the mirror, as at 220, and to then direct the optical axis 222 rearwardly beneath the filter 202 and detector 204. A second inclined mirror 224 directs the optical axis 222 upwardly through an aperture 226 in the transverse plate 56. A third inclined mirror 228 directs the optical axis through a magnifier chamber 230 that contains one or more magnifying lenses selectively interposable in the optical path and into a video camera 232 mounted on the plate 56 in the upper portion 52 of the housing.

The video output of the camera 232 not only provides a continuous picture of that portion of a workpiece surface interposed on the primary X-ray beam axis on the display unit 14 but is also adapted to provide selected textual material relating to measurement parameters on our display unit coincidentally therewith.

In order to permit the accurate positioning of the desired area of exposure on a workpiece to be measured in the path of the primary X-ray beam emanating from a selected collimating sleeve 174, an improved stage assembly that permits operator controlled displacement of the stage supported workpiece in three directions through operation of the joystick-type control 42 is provided. As best shown in FIGS. 3 and 4, such assembly includes a fixed base plate 250 surmounted by a first moveable plate 252 that is selectively displaceable in a horizontal plane and in one side to side direction on a pair of slides 256 by a first stepper motor 254. Mounted on said first moveable plate 252 and selectively displaceable in the horizontal plane in a direction perpendicular to that of the first plate displacement is a second moveable plate 260. Such second moveable plate 260 is mounted on a second pair of slides 262 on plate 252 and is independently displaceable with respect thereto by a second stepper motor 264. As will be apparent the independently displaceable plates 252 and 260 provide for two directions of displacement. Mounted on the marginal edges of the second moveable plate and displaceable in the horizontal plane conjunction therewith scissor-type assembly 270 having the end of one arm 272 pivotally secured thereto, as at 274, and the end of the other arm 276 riding in a slide 278. The remote end of arm 276 is pivotally secured to a third plate 280, as at 282. The remote end of arm 272 also supports the third plate 280 and rides in a slide 284 therein. Displacement of the arm 276 in slide 278 by action of a third stepper motor 286 controls the displacement of the plate 280 in the vertical direction.

In order to limit the amount of permitted vertical displacement of the third plate 280 and to prevent physical contact between the underside of the collimator carriage assembly 136 and a specimen or workpiece supported by plate 280, a displacement limit control is included. As schematically set forth in FIG. 14 such a limit control desirably includes an interruptable light beam 290 emanating from a light source 292 and received by a photocell 294. The photocell 294 may be directly or indirectly included in the power circuit for the stepper motor 286 and so arranged that the interruption of the light beam 290 by the rising plate 280 or element mounted thereon will open the power circuit for the stepper motor 286 and thus halt further elevation thereof.

The sample stage plate 196 is supported by the third plate 280 and through the summation of the horizontal displacements of the first plate 252, and the second plate 260 and the vertical displacement of the third plate 280 through appropriate stepper motor activation in selective response to the indicated vector displacements of the joystick control 42, any portion of a specimen or other workpiece resting upon the stage plate 196 may be moved into the path of the incident X-ray beam 70 and disposed at any desired elevation relative to the bottom of the base element 144 of the collimator carriage assembly 136.

In addition to the foregoing, the sample stage plate 196 is mounted so as to be independently displaceable in the horizontal direction relative to the third plate 280 through the actuation of a drive solenoid 290. This latter permitted movement, which is desirably made operatively responsive to the opening of the front door panel 22, serves to effect an automatic forward displacement of the stage 196 toward the open front of the housing to facilitate sample or specimen positioning on the stage 196 intermediate measurement operations. Upon closure of front panel 22 an accompanying retraction of the stage 196 is effected. Such automated movement of the stage plate 196 is readily integrated with an interlock system for the front door panel 22, as for example, by a simple control circuit of the type depicted in FIG. 15. As there shown an interlock switch 292 is adapted to be closed in response to the opening of the front door panel 22 to complete a power circuit for the solenoid 290. Solenoid energization effects a selective displacement of the specimen stage 196 toward the opened panel. As long as the door panel 22 is open the solenoid 290 will remain energized and the stage 196 will be maintained in an advanced position to facilitate specimen placement or removal therefrom. Closure of the door panel 22 will open interlock switch 292, opening the power circuit and deenergizing the solenoid to permit a spring biased return of the stage 196 to its retracted position.

As will now be apparent the above described construction provides for a highly collimated primary X-ray beam in association with a controllable diameter thereof through the availability of a plurality of collimating inserts 174 of differing predetermined internal diameter positionable in coaligned relation with the axis of the primary X-ray beam.

Figure 16:
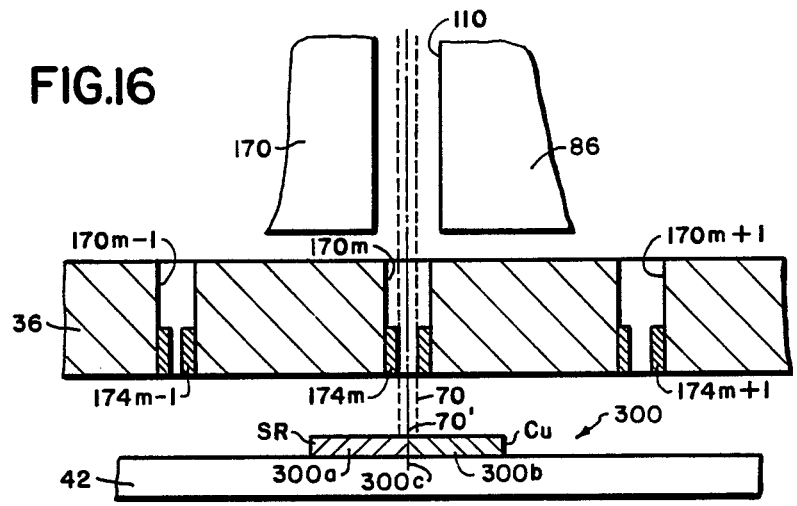
FIG. 16 is an enlarged fragmented elevational view of the collimator carriage in schematic, showing a standard reference element positioned on the support stage during automatic initial calibration or alignment of the positions of the collimator sleeves.
Figure 17:
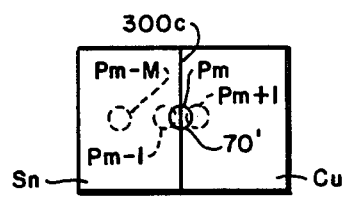
FIG. 17 is a top plan view of the standard reference element shown in FIG. 16, suggesting possible positions of the surfaces irradiated by the X-ray beam for different positions of the collimator carriage.
Figure 18:
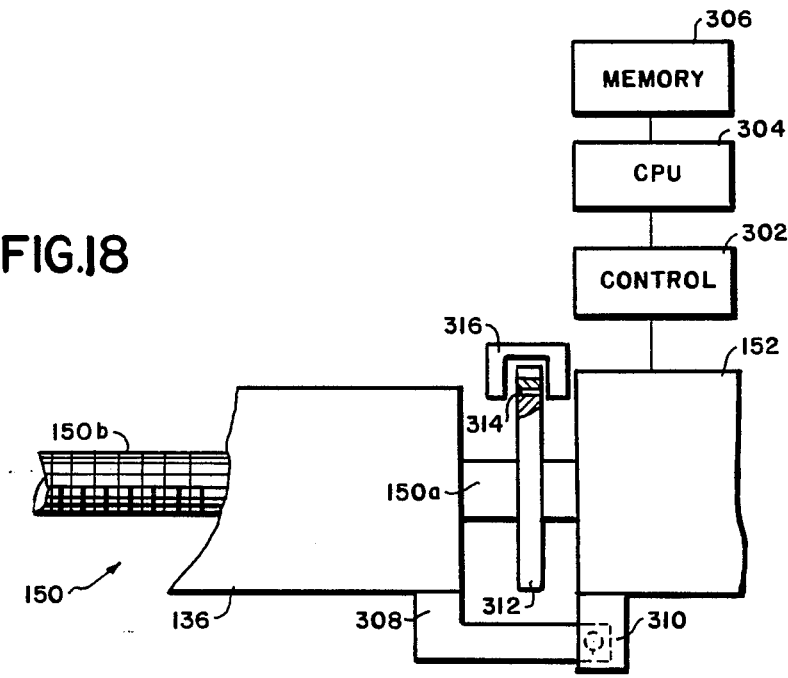
FIG. 18 is an enlarged fragmented plan view of the collimator carriage and drive therefore, in schematic, and showing, in block diagram form, the elements for controlling the stepper motor and detecting the return of the collimator carriage to a "home" position.

Because the diameters of the collimator sleeves 174 can be on the order of 0.001", it will be appreciated that precise alignment of the collimator sleeves with respect to the X-ray beam 70 is crucial to obtain precise and repeatable results. Reference will be made to FIGS. 16-18 to describe the manner in which the collimator sleeves 174 are initially located at their optimum aligned positions to provide maximum irradiation of the samples.

The collimator carriage 136 includes respective bores $170_{m-1}$, $170_m$ and $170_{m+1}$ into which respective collimator sleeves $174_{m-1}$, $174_m$ and $174_{m+1}$ have been inserted. The collimator sleeves have been exaggerated to more clearly illustrate a possible arrangement of such sleeves which successively decrease in diameter from right to left, as viewed in FIG. 16.

In FIG. 16, bore $170_m$ is aligned with the axis of the X-ray beam 70. A standard reference element generally designated by the reference numeral 300 is shown on the work piece support stage 42. The standard reference element 300 comprises two sections 300a and 300b made, respectively, of tin (Sn) and Copper (Cu) which are abutted at parting line 300c.

Referring to FIG. 18, the drive system 150 for the collimator carriage element 136 includes a threaded portion 150b which forms a lead screw and an unthreaded portion 150a proximate to the stepper motor 152. A stepper motor control circuit 302 is connected to the stepper motor 152 for feeding control pulses to the stepper motor in a conventional manner. The control circuit 302 is connected to a CPU 304 which, in turn, has access to memory 306. The specific control elements used are not critical and any conventional control elements typically used to control stepper motors may be used for this purpose.

In order to optimize accuracy and predictability, a flat positioning element 308 is mounted on and moves with the collimator carriage element 136. One extreme position of the collimator carriage element 136 is selected to be a reference or "home" position. To locate such "home" position there is provided a light source/photo-cell detector unit 310 which receives at least a portion of the flat positioning element 308 and can detect same when the "home" position is reached. In order to enhance the resolution and the accuracy of the "home" position there is advantageously provided a chopper disc 312 mounted on the unthreaded portion 150a which is provided with a hole 314 in the region of its periphery, which cooperates with a light source/photo-cell detector 316 which is arranged to detect when the hole 314 enters therein. The "home" position is defined by the software as that position of the collimator carriage 136 when both the flat positioning element 308 as well as the hole 314 of the chopper disc 312 have been detected by the light source/photo-cell detectors 310, 316, respectively.

The procedures for initially locating the optimum positions for the collimator inserts or sleeves 174 and subsequently repeating those positions during actual measurements will now be described.

The initial optimization of the positions of the collimator inserts or sleeves 174 is achieved through software. Such initialization is peformed at the factory and not by the user. Once obtained, the initialization or optimization information can be stored on any storage medium, such as ROM, tape or disc. The initial alignment procedure is outlined by the flow chart shown in FIG. 19 and is achieved by using steps 320-334.

At the commencement of the alignment procedure, 320, the collimator carriage element is moved to the home position illustrated in FIG. 18. This requires the issuance of pulses at the output of the control circuit 302 until detection has been made of both the flat positioning element 308 and the hole 314. Once the "home" position has been precisely located, the apparatus now knows the precise position of the collimator carriage 136. This is essential for the system to identify other positions of the carriage element relative to the "home" position and to enable it to subsequently precisely return to predetermined desired positions. After the "home" position has been identified and an arbitrary count has been selected to represent that reference position ($n_i$), at step 322, the system is ready to align the first collimator insert or sleeve 174 with the axis of the X-ray beam and record the precise position of the collimator carriage 136 when optimum alignment has been achieved. The designation m=1, at 323, arbitrarily designates a particular collimator sleeve or insert $174_m$ to be aligned. The specific order in which the collimator sleeves or inserts 174 are aligned is not critical, although it is normally advantageous to align same sequentially or successively along the carriage 136 because of the long periods of time it takes to move the carriage 136 in minute steps due to the action of the stepper motor 152, (e.g. 100-125 micro-inches per step).

At 324, the system requires the movement of the carriage element 136 to a position which generally aligns the collimator sleeve $174_m$ with the X-ray beam 70. In practice this can be achieved in a number of ways. Thus, the carriage 136 may be moved manually to bring the sleeve at least into partial alignment with the X-ray beam. Detent on the carriage, for example, can also be provided to facilitate movement of the carriage to the approximate aligned position. Optical means and other mechanical sensors may also be used. However, the foregoing techiques have not proven satisfactory because of the high tolerances required. With inside diameters of the collimator inserts or sleeves being on the order of 0.001", required tolerances may exceed 0.0001".

One preferred method of moving the carriage 136 to the general alignment position of bore $174_m$ is to issue an appropriate number of pulses to the stepper motor 152 which will move the carriage from the "home" position or a prior sleeve position to a position which will result in at least partial transmission of radiation through the bore $170_m$ so that an output can be detected and analyzed. Such initial movement can be approximated knowing the distances from the axes of the collimator sleeves from each other and from the "home" position and the incremental movements of the carriage 136 for each step of the motor 152 in response the application of a pulse by the control circuit 302. The stepper motor 152, and the pitch of the lead screw 150, can be selected to provide stepped movements of the carriage 136 in desired increments on the order order of magnitude above suggested.

At each position of the carriage 136, a reading is taken (at 325). If no count is detected, at 326, another step is applied and the position of the bore $174_m$ is incremented. This procedure continues until a count is detected (where there is at least partial transmission of the X-ray beam so that radiation impinges on the standard reference element 300). If desired, this initial locating approach can be modified so that the stepper motor is moved $n_m$ steps to bring the collimator sleeve $174_m$ to a predicted approximate aligned position before checking for a count.

Once a count has been detected, the output is analyzed for spectrum content, at 328. Since the standard reference element 300 is known to comprise copper and tin abutting at parting line 300, the aligned position is selected to be that position where the radiated surface 70' is symmetrically arranged with regard to the parting line 300c, as suggested in FIG. 17. The spectrum is compared with a reference spectrum for one-half copper and one-half tin. If the detected spectrum corresponds to the reference spectrum, the aligned position count $N_m$ is saved, at 330, on a suitable storage medium such as disc, and the next succeeding collimator sleeve is selected for alignment, at 331, at which time the process is repeated for the next sleeve. If the spectrum which is analyzed does not correspond to the reference spectrum, a determination is made, at 332, as to whether too much copper is detected, at 332. If the aforementioned is the case, the carriage 136 is moved towards the tin, at 334, and if the reverse is true, the carriage 136 is moved towards the copper, at 333. After the carriage has been moved, in one direction or the other, by one step, a reading is again taken, at 325, and the process is repeated. An iteration process, in which the foregoing is repeated (minor modifications between successive repetitions), results in a binary search for the optimum count rate. This, allows the apparatus to "zero in" on the reference spectral response which provides the optimum count rate. This, in turn, is defined as the aligned position of a given collimator sleeve. The procedure is suggested in FIG. 17, wherein the radiated surface 70' is shown as a circular area in the aligned position. However, before that position is reached, radiation might have initially impinged at position $p_{m-r}$, subsequently to positions $p_{m+1}$, position $p_{m-1}$ and finally, position $p_m$.

As suggested, once the analyzed spectral content correponds to a reference spectral response for a given standard reference element, the position or count $N_m$ required for the stepper motor to achieving that position of a collimator element is saved, at 330, on disc for later reference by the user during the performance of actual measurements.

A measurement procedure is outlined in Figure 20. The measurement mode normally entails steps 335–346. After a specimen to be analyzed has been located on the support stage 42, and the system has been activated, the CPU 304 and associated peripherals are booted, at 335. An initial instruction provided by the CPU to the control circuit 302 is to step the collimator carriage 136 to its "home" position, at 336.

At 337, the user selects the test parameters to be used during the measurement, this including the identification of the specific collimator insert or sleeve 174 to be used. This might be selected, also, by the user as an area of irradiation 70', a diameter of irradiation, or a size of a part to be analyzed. Whichever parameter the user selects, however, this defines the specific collimator insert or sleeve 174 to be used during the measurement. For purposes of the discussion, it will be assumed that the user has selected, at 337, collimator sleeve $174_m$. At 338, the previously recorded or saved position of bore $170_m$ is requested from memory (or look-up table), at 339. The step count required from "home" position, and therefore from any bore position to another bore position, is stored on disc in the embodiment being described. This information can be resident on disc or stored in memory 306 during initial booting of the system. At 340, the appropriate count $N_m$ for bore $170_m$ is obtained from the memory look-up table. The step count at any given position of the collimator carriage 136 is compared with the desired step count $N_m$. If the two counts correspond to each other, the system concludes that the appropriate aligned position has been located, at 342, and the measurement may proceed. If, however, the count corresponding to the collimator carriage 136 does not correspond to the desired count $N_m$, comparisons are made at 341 and 343. If the step count corresponding to the actual position to the collimator carriage 136 is greater the desired step count $N_m$, the actual step count is decreased by one, at 344, and the appropriate instruction is transmitted to the step motor 346 to move to a position corresponding to a step count which has been decreased by one. Correspondingly, if the step count, at 343, is less than the desired step count $N_m$, the actual step count is increased by one, at 345, and an appropriate signal is transmitted to the step motor 346 to move to a position which is higher by one count.

After the step motor 346 has thusly been incremented in position, the procedure is repeated, at 341, and such iterative method can be continued until a "yes" response has been achieved at 341, and the step count corresponding to the actual position of the collimator carriage 136 is equal to the desired step count $N_m$.

As described above, therefore, the instrument must know, in software, where each collimator sleeve 174 is located and, after such information has been established and recorded in a storage medium, the system, again using software techniques, can always return to and re-establish the optimum aligned positions of the collimator sleeves or elements 174 to provide the greatest amount of X-ray transmission or irradiation of the samples to be measured and, therefore, to provide accurate and reliable results.

Figure 19:
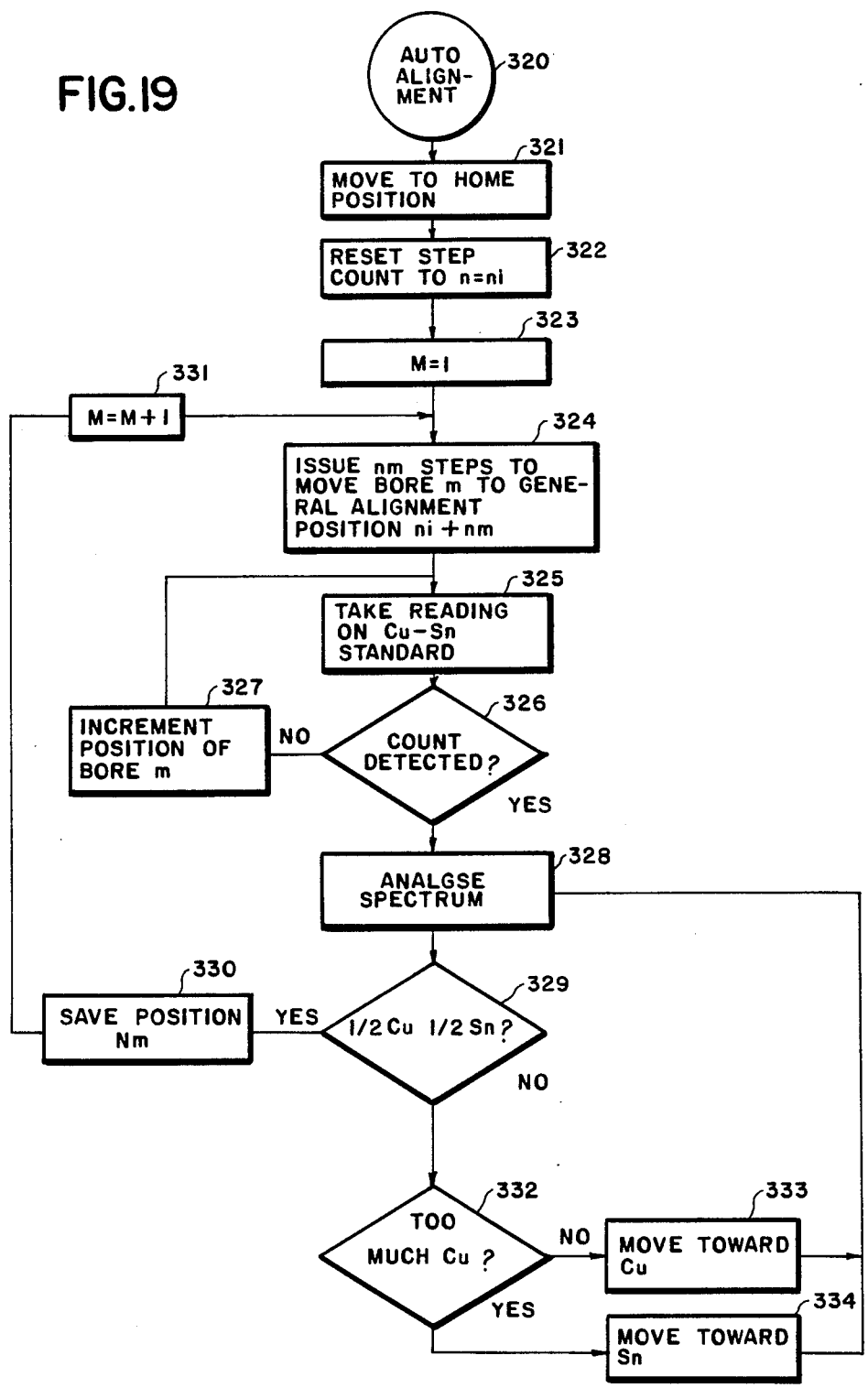
FIG. 19 is a flow chart illustrating the procedure for initially automatically calibrating or aligning the positions of the collimator sleeves.

It will be appreciated that the procedures outlined in FIGS. 19 and 20 are merely exemplary of software techniques which can be employed to achieve the desired results. Generally, one or more steps may be modified while still utilizing the basic approach.

While there has been shown and described one presently preferred embodiment of the invention, it should be understood that the structure disclosed may be modified in various ways without departing from the spirit and scope of the invention as defined by the claims appended hereto.

We claim:

1. In an X-ray fluorescence thickness measuring apparatus means for emitting primary x-radiation along an optical axis;
   a plurality of coaligned bores of substantially uniform diameter defining a beam transmission path having a longitudinal axis coincident with said optical axis of said beam of said emitted radiation;
   a collimator carriage mounted for movement along a direction substantially transverse to said longitudinal axis and arranged to intercept said optical axis in each position thereof to thereby expose successive portions of said collimator carriage to said beam of said emitted radiation and having a plurality of mounting bores arranged along a path defined by said successive portions;
   a plurality of collimator sleeves inserted in said mounting bores of said collimator carriage disposed parallel to said longitudinal axis of said beam transmission path and spaced from each other predetermined distances, said collimator sleeves having predetermined internal diameters to control the extent of the transmission of said X-ray beam through said collimator carriage to a sample to be analyzed;
   displacement means for displacing said collimator carriage to coalign a selected one of said collimator sleeves with said longitudinal axis of said X-ray beam transmission path, said displacement means comprising control means for controlling longitudinal displacements of said collimator carriage along said transverse direction;
   memory means for storing data representing the positions of said collimator carriage at desired positions thereof corresponding to aligned positions of said collimator sleeves and said longitudinal axis; and
   CPU means for processing data in said memory means representing said desired aligned positions and for actuating said control means to move said collimator carriage to said desired aligned positions during analysis of a sample with said apparatus.

2. In an apparatus as set forth in claim 1, wherein said control means comprises a stepper motor and a lead screw threadedly engaged with said collimator carriage and a step motor cooperating with said lead screw to move said collimator carriage a predetermined step for each actuation of said step motor.

3. In an apparatus as set forth in claim 1, further comprising locating means for locating a "home" position of said collimator carriage.

4. In an apparatus as set forth in claim 3, wherein said locating means comprises detecting means for detecting the position of said collimator carriage at said "home" position.

5. In an apparatus as set forth in claim 4, wherein said detecting means includes a positioning element mounted on said collimator carriage for movement therewith and a detector sensitive to the movement of said positioning element to a predetermined position.

6. In an apparatus as set forth in claim 5, wherein said positioning element comprises a flat positioning member and said detector is a light source/photo-cell unit to alter the state of said unit which can receive said flat positioning member therein.

7. In an apparatus as set forth in claim 5, wherein said displacement means comprises a lead screw threadedly engaged with said collimator carriage and a stepper motor cooperating with said lead screw to move said collimator carriage a predetermined step for each actuation of said step per motor, further comprising resolution enhancement means for more precisely locating said "home" position, said resolution enhancement means comprising a chopper disc mounted on said lead screw for rotation therewith and having an aperture therethrough proximate to the periphery thereof and for monitoring said chopper disc to detect the movement of said aperture to a predetermined circumferential position prior to the commencement of a measurement.

8. In an apparatus as set forth in claim 1, wherein said coaligned bores define
a shutter block disposed transverse to said x-ray beam transmission path having a primary bore extending therethrough disposed in coaligned relation with said plurality of bores defining said transmission path,
a secondary bore in said shutter block disposed transverse to and intersecting said primary bore therein,
a shutter element disposed for linear slidable movement within said secondary bore having a transverse tertiary bore therein selectively positionable in coaligned relation with said primary bore in said shutter block, and means for linearly displacing said shutter element in said secondary bore from a first position where said tertiary bore is disposed in coaligned relation with said primary bore to form a continuance of said transmission path for said beam of X-radiation through said shutter block and a second position where said tertiary bore is disposed remote from said primary bore to block said transmission path and prevent said emitted X-ray beam from passing through said shutter block.

9. In an apparatus as set forth in claim 8, further comprising
a fourth bore in said shutter block disposed transverse to and intersecting said primary bore therein,
a filter element carrier member slidably disposed within said fourth bore having at least a fifth and a sixth transverse bore therein each selectively positionable in coaligned relation with said primary bore in said shutter block,
a filter element disposed in at least said fifth transverse bores, and
means for displacing said filter element carrier member in said fourth bore from a first position where said fifth bore is disposed in coaligned relation with said primary bore in said shutter block to a second position where said sixth bore is disposed in coaligned relation with said primary bore in said shutter block.

10. In an apparatus as set forth in claim 1, further comprising a mirror element mounted on a side of said collimator carriage where the X-ray beam exits from said collimating sleeves and disposed at a predetermined angle with respect to the longitudinal axis thereof.

11. In an apparatus as set forth in claim 1, wherein at least one of said mounting bores in said collimator carriage is intersected by a transverse bore intermediate the ends thereof,
a reference standard sample being disposed at the intersection of said longitudinal and transverse bores positioned to transmit fluorescent X-radiation on said sample externally of said carriage member through said transverse bore.

12. In an X-ray fluorescence thickness measuring apparatus means for emitting primary x-radiation along an optical axis;
a plurality of coaligned bores of substantially uniform diameter defining a longitudinal axis coincident with said optical axis of said beam of said emitted radiation;
a collimator carriage mounted for movement along a direction substantially transverse to said longitudinal axis and arranged to intercept said optical axis in each position thereof to thereby expose successive portions of said collimator carriage to said beam of said emitted radiation and having a plurality of mounting bores arranged along a path defined by said successive portions;
a plurality of collimator sleeves inserted in said mounting bores of said collimator carriage disposed parallel to said longitudinal axis of said beam transmission path and spaces from each other predetermined distances, said collimator sleeves having predetermined internal diameters to control the extent of the transmission of said X-ray beam through said collimator carriage to a sample to be analyzed;
displacement means for displacing said collimator carriage to coalign a selected one of said collimator sleeves with said longitudinal axis of said X-ray beam transmission path;
alignment means for initially locating the desired aligned positions of said collimator sleeves and for saving data in memory representing said desired aligned positions for subsequent processing by a CPU and use during analysis of a sample with said apparatus wherein said displacement means includes CPU means for extracting said data representing said desired aligned positions from memory and using same to move said collimator carriage to selected areas of said desired aligned positions.

13. A method of moving a collimator carriage of an X-ray fluorescence thickness measurement apparatus to precisely align one of a plurality of collimator sleeves inserted into bores in the collimator carriage with an X-ray transmission path by controlling increments of displacement of a step motor determined by a step motor count, the method comprising the steps of:

moving the collimator carriage to a reference or "home" position;

resetting and storing the step motor count in memory to an initial known quantity representing the position of the collimator carriage in said "home" position;

selecting the collimator sleeve m to be used during a measurement or analysis of a sample or specimen;

using CPU means obtaining a step motor count $N_m$ from a look-up table which identifies the number of uniform increments of displacement required of the collimator carriage to move from said "home" position to bring the collimator sleeve m into alignment with said X-ray transmission path;

comparing the actual step motor count corresponding to the distance traversed by the collimator carriage with the count $N_m$;

incrementing the step motor count, by an interative method, to bring correspondence between the actual step motor count and the desired step motor count $N_m$, and terminating further movements of the collimator carriage once said correspondence has been achieved to permit a measurment of the sample or specimen to be analyzed.

14. In an X-ray fluorescence thickness measuring apparatus means for emitting primary x-radiation along an optical axis;

a plurality of coaligned bores of substantially uniform diameter defining a beam transmission path having a longitudinal axis coincident with said optical axis of said beam of said emitted radiation;

a collimator carriage mounted for movement along a direction substantially transverse to said longitudinal axis and arranged to intercept said optical axis in each position thereof to thereby expose successive portions of said collimator carriage to said beam of said emitted radiation and having a plurality of mounting bores arranged along a path defined by said successive portions;

a plurality of collimator sleeves inserted in said mounting bores of said collimator carriage disposed parallel to said longitudinal axis of said beam transmission path and spaced from each other predetermined distances, said collimator sleeves having predetermined internal diameters to control the extent of the transmission of said X-ray beam through said collimator carriage to a sample to be analyzed;

displacement means for displacing said collimator carriage to coalign a selected one of said collimator sleeves with said longitudinal axis of said X-ray beam transmission path;

said displacement means comprising a lead screw threaddedly engaged with said collimator carriage and a step motor cooperating with said lead screw to move said collimator carriage a predetermined step for each actuation of said step motor, said displacement means further comprising a control circuit for controlling said stepper motor, memory means for storing data representing the positions of said collimator carriage at desired preselected positions thereof, and CPU means for saving data in said memory means representing said desired predetermined positions and for actuating said control circuit to move said collimator carriage to said desired preselected locations saved in said memory means.

15. Method of aligning a collimator carriage of an X-ray fluorescence thickness measurement apparatus to precisely align a plurality of collimator sleeves inserted into bores in the collimator carriage with a longitudinal axis of an X-ray transmission path controlling increments of displacement of a step motor determined by a step motor count, the method comprising the steps of:

moving the collimator carriage to a reference or "home" position;

resetting and storing the count to an initial known quantity representing the position of the collimator carriage in said "home" position;

selectively incrementing the position of the collimator carriage until a collimator sleeve m has been brought substantially into alignment with the longitudinal axis wherein the apparatus detects a photon count representative of a spectrum of a standard reference sample having known spectral parameters;

repeating said incrementing step, by iterative method, to perform a binary search until correspondence has been achieved between the detected spectrum and the known reference spectral parameters;

saving count $N_m$, when correspondence has been achieved, in a storage medium of the number of steps required to move the collimator carriage to align collimator sleeve m with the longitudinal axis, and repeating said incrementing and saving steps for the next successive collimator elements until counts have been stored for all collimator sleeves on said collimator carriage for subsequent binary searching during a measurement of a sample to be analyzed.

16. Method of aligning a collimator carriage as defined in claim 15, wherein an alignment position is achieved by moving the collimator carriage a distance corresponding to a predicted count $N_m$.

* * * * *